United States Patent [19]

Wilson et al.

[11] Patent Number: 4,663,139

[45] Date of Patent: May 5, 1987

[54] CRYSTALLINE ALPO$_4$-39

[75] Inventors: Stephen T. Wilson, Shrub Oak; Lisa King, Putnam Valley, both of N.Y.

[73] Assignee: Union Carbide Corporation, Danbury, Conn.

[21] Appl. No.: 807,672

[22] Filed: Dec. 16, 1985

[51] Int. Cl.$^4$ .............................................. C01B 25/36
[52] U.S. Cl. ...................................... 423/305; 502/208
[58] Field of Search ................. 502/208; 423/305, 306

[56] References Cited

U.S. PATENT DOCUMENTS

| | | | |
|---|---|---|---|
| 4,310,440 | 1/1982 | Wilson et al. | 423/305 |
| 4,392,984 | 7/1983 | Engelbach et al. | 502/208 |
| 4,440,871 | 4/1984 | Lok et al. | 208/114 |
| 4,473,663 | 9/1984 | Patton et al. | 502/208 |
| 4,481,174 | 11/1984 | Baacke et al. | 502/214 |
| 4,486,397 | 12/1984 | Eshraghi et al. | 502/208 |
| 4,500,651 | 2/1985 | Lok et al. | 502/208 |
| 4,512,905 | 4/1985 | Clearfield et al. | 423/306 |
| 4,554,143 | 11/1985 | Messina et al. | 423/306 |
| 4,567,029 | 1/1986 | Wilson et al. | 502/208 |

FOREIGN PATENT DOCUMENTS

| | | | |
|---|---|---|---|
| 0141662 | 5/1985 | European Pat. Off. | 502/208 |
| 2119778 | 11/1983 | United Kingdom | 423/305 |

*Primary Examiner*—John Doll
*Assistant Examiner*—Lance Johnson
*Attorney, Agent, or Firm*—Richard G. Miller

[57] ABSTRACT

A novel crystalline aluminophosphate of the molecular sieve type, denominated AlPO$_4$-39, is prepared by hydrothermal synthesis from reactive sources of aluminum and phosphorus and an organic templating agent.

5 Claims, No Drawings

CRYSTALLINE ALPO₄-39

FIELD OF THE INVENTION

The present invention relates in general to crystalline aluminophosphate compositions, and more particularly to a novel crystalline aluminophosphate of the molecular sieve type, and to the methods for its preparation.

BACKGROUND OF THE INVENTION

Microporous crystalline aluminophosphate compositions having open framework structures formed of $AlO_2$ and $PO_2$ tetrahedral units joined by the sharing of the corner oxygen atoms and characterized by having pore openings of uniform dimensions have heretofore been disclosed in a number of publications, notably the specification of U.S. Pat. No. 4,310,440 issued July 7, 1980 to S. T. Wilson et al. The Wilson et al aluminophosphates constitute a generic class of non-zeolitic molecular sieve materials which are capable of undergoing complete and reversible dehydration while retaining the same essential framework topology in both the anhydrous and hydrated state. By the term "essential framework topology" or "essential framework structure" as used in the aforesaid patent, and also in the present specification and claims,, is meant the spatial arrangement of the primary Al—O and P—O bond linkages. Other microporous aluminophosphates which undergo structure rearrangements, either reversibly or irreversibly, upon partial or complete dehydration are also known, for example the minerals variscite and metavariscite and certain of the synthetic metastable aluminophosphates reported by F. D'Yvoire [Bull. Soc. Chim. France, 1762 (1961)]. Another class of synthetic crystalline compositions which contain framework tetrahedral metal oxides of manganese, magnesium, cobalt and/or zinc in addition the $AlO_2$ and $PO_2$ tetrahedra are disclosed in commonly assigned copending application Ser. No. 514,334 filed July 15, 1983.

SUMMARY OF THE INVENTION

The present invention comprises a novel microporous crystalline aluminophosphate, denominated AlPO₄-39 and the methods for its preparation. AlPO₄-39 has an essential framework structure whose chemical composition, expressed in terms of mole ratios of oxides, is:

$$Al_2O_3 : 1.0 \pm 0.2 P_2O_5$$

and exhibits an X-ray powder diffraction pattern which contains at least the d-spacings set forth in Table I set forth hereinafter.

AlPO₄-39 can be prepared by hydrothermal crystallization from a reaction mixture containing in addition to water, a reactive source of aluminum and phosphorus and an organic templating agent which is preferably an alkyl amine, and most preferably di-n-propylamine.

DETAILED DESCRIPTION OF THE INVENTION

The novel microporous aluminophosphate of the present invention can be produced by hydrothermal crystallization from a reaction mixture containing reactive sources of phosphorus and aluminum and an organic templating agent, preferably di-n-propylamine ($Pr_2NH$). The preparative process typically comprises forming a reaction mixture which in terms of molar ratios of oxides is $$Al_2O_3 : 1 \pm 0.5 P_2O_5 : 7-100 H_2O$$

and contains at least about 1.5 moles of di-n-propylamine per mole of $Al_2O_3$. The reaction mixture is placed in a reaction vessel inert toward the reaction mixture and heated at a temperature of at least about 100° C., preferably between 100° C. and 300° C., until crystallized, usually a period of from 2 hours to 2 weeks. The solid crystalline reaction product is then recovered by any convenient method, such as filtration or centrifugation washed with water and dried in air at a temperature between ambient and about 100° C. In a preferred crystallization method, the source of phosphorus is phosphoric acid, and the source of aluminum is a pseudoboehmite hydrated aluminum oxide, the temperature is 150° C. to 200° C. the crystallization time is from 3 to 7 days, and the ratio of inorganic oxides in the reaction mixture is $$Al_2O_3 : 0.8-1.2 P_2O_5 : 25-75 H_2O$$

The preferred templating agent is di-n-propylamine and is present in the reaction mixture in an amount of from about 1.5 to 2.0 moles per mole of alumina. Additionally present, because of the relatively high concentration of the basic amine, is from about 0.25 to 1.5, preferably 0.5 to 1.0, moles of an organic or mineral acid such as acetic acid or hydrochloric acid. In general the stronger the acid, the lower will be its preferred concentration in the reaction mixture, within the aforesaid range. In the preferred crystallization procedure, acetic acid is present in an amount of about 1 mole per mole of alumina and di-n-propylamine is present in an amount of about 2.0 moles per mole of alumina.

It is to be noted that di-n-propylamine has heretofore been employed as the templating agent in the hydrothermal synthesis of another microporous crystalline aluminophosphate, namely AlPO₄-31. The synthesis of AlPO₄-31 is reported in U.S. Pat. No. 4,385,994 issued May 31, 1983. In that synthesis, however, the di-n-propylamine was present in relatively low concentrations in the reaction mixture, i.e. 1 mole per mole of alumina, and no acid was added to the reaction mixture. From the available data, it appears likely that AlPO₄-39 can suitably be synthesized using lesser amounts of di-n-propylamine templating agent, or even none at all, provided seed crystals of previously prepared AlPO₄-39 are also present in the reaction mixture to influence the course of the crystallization.

The template-containing as-synthesized form of AlPO₄-39 of the present invention has an essential framework structure whose chemical composition expressed in terms of mole ratios of oxides is:

$$Al_2O_3 : 1.0 \pm 0.2 P_2O_5$$

and has a characteristic X-ray powder diffraction pattern which contains at least the d-spacings set forth in Table 1 below:

TABLE I

| 2θ | d, (A) | Relative Intensity |
|---|---|---|
| 9.49–9.52 | 9.32–9.29 | S |
| 13.45–13.46 | 6.58 | M |
| 18.46–18.52 | 4.81–4.79 | M |
| 21.30–21.34 | 4.17–4.16 | VS |

TABLE I-continued

| 2θ | d, (A) | Relative Intensity |
|---|---|---|
| 22.88–22.92 | 3.88–3.89 | VS |
| 30.29–30.32 | 2.95–2.96 | M |

All of the as-synthesized forms of AlPo$_4$-39 for which X-ray powder diffraction data have been obtained to date have pattterns within the generalized pattern of Table II below:

TABLE II

| 2θ | d, (A) | Relative Intensity |
|---|---|---|
| 9.49–9.52 | 9.32–9.29 | S |
| 13.45–13.46 | 6.58 | M |
| 18.46–18.52 | 4.81–4.79 | M |
| 21.30–21.34 | 4.17–4.16 | VS |
| 22.88–22.92 | 3.88–3.89 | VS |
| 26.97–27.37 (br) | 3.26–3.30 | W |
| 27.90–28.05 (br) | 3.19–3.20 | W |
| 28.15–28.22 | 3.16–3.17 | W |
| 28.65–28.74 (sh) | 3.11–3.12 | W |
| 30.29–30.32 | 2.95–2.96 | M |
| 34.53–34.59 | 2.59–2.60 | W |
| 34.86–34.88 | 2.56–2.57 | W |
| 38.27–38.53 | 2.33–2.35 | W | sh = shoulder
br = broad

When the as-synthesized AlPO$_4$-39 compositions are calcined, i.e., heated at a temperature sufficiently high, typically between about 300° C. and about 700° C., or otherwise treated, such as by chemical oxidation, to remove essentially all of the organic templating agent present in the intracrystalline pore system, the composition has an X-ray powder diffraction pattern which contains at least the d-spacings set forth in Table A below:

TABLE A

| 2θ | d, (A) | Relative Intensity |
|---|---|---|
| 9.53 | 9.28 | W–M |
| 13.56 | 6.53 | VS |
| 18.64–19.10 | 4.65–4.76 (br) | W |
| 21.53 | 4.14 | W–M |
| 22.68–23.23 | 3.82–3.93 (br) | W |
| 29.23 | 3.06 | W |
| 29.54 | 3.02 | W | br = broad

The above X-ray patterns and all other X-ray patterns appearing hereinafter were obtained by use of either a standard X-ray powder diffraction technique or by use of computer based techniques using a Siemens D-500 X-ray powder diffractomer, available from Siemens Corporation, Cherry Hill, N.J. When the standard X-ray technique is employed radiation source is a high-intensity, copper target, X-ray tube operated at 50 Kv and 49 ma. The diffraction pattern from the copper K-alpha radiation and graphite monochromator were recorded by an X-ray spectrometer scintillation counter, pulse height analyzer and strip chart recorder.

Flat compressed powder samples are scanned at 2 degrees (2theta) per minute, using a two second time constant. Interplanar spacings (d) in Angstrom units are obtained from the position of the diffraction peaks expressed as 2θ (theta) as observed on the strip chart where theta is the Bragg angle. Intensities were determined from the heights of diffraction peaks after subtracting background, "$I_o$" being the intensity of the strongest line or peak, and "I" being the intensity of each of the other peaks.

As will be understood by those skilled in the art the determination of the parameter 2 theta, irrespective of the technique employed, is subject to both human and mechanical error, which in combination, can impose an uncertainty of about 0.4° on each reported value of 2 theta. This uncertainty is of course, also manifested in the reported value of the d-spacings, which are calculated from the 2 theta values. This imprecision is general throughout the art and is not sufficient to preclude the differentiation of the present crystalline materials from the compositions of the prior art. In some of the X-ray patterns reported, the relative intensities of the d-spacings are indicated by the notations VS, S, M, and W which represent Very Strong, Strong, Medium and Weak respectively.

AlPO$_4$-39 exhibits surface characteristics which make it useful as a catalyst or catalyst support in various hydrocarbon conversion and oxidative combustion processes. AlPO$_4$-39 can be associated with catalytically active metals, e.g., by framework substitution, by impregnation, doping and the like, by methods traditionally used in the art for the fabrication of catalyst compositions.

Further, AlPO$_4$-39 has a pore size of less than about 4.3 Angstroms which makes AlPO$_4$-39 suitable for use as a molecular sieve for the separation of molecular species.

The following examples are provided to illustrate the invention and are not to be construed as limiting thereof:

EXAMPLE 1

AlPO$_4$-39 was prepared by combining 27.2 grams of a hydrated aluminum oxide, a pseudo-boehmite phase comprising 75.1 (wt.%) weight percent Al$_2$O$_3$ and 24.9 (wt.%) weight percent H$_2$O, with a solution of 46.2 grams of 85wt. % ortho-phosphoric acid (H$_3$PO$_4$) and 46.2 grams of H$_2$O. The resulting mixture was stirred until a homogeneous mixture was observed. This mixture was then mixed with 12.1 grams glacial acetic acid (CH$_3$COOH) and the resulting mixture stirred until homogeneous. To the above mixture 40.5 grams di-n-propylamine (nPr$_2$NH) was added and the resultant mixture was once again mixed until homogeneous. The composition of reaction mixture in molar oxide ratios was:

$$2.0n\text{-}Pr_2NH:Al_2O_3:P_2O_5:CH_3COOH:40H_2O$$

The reaction mixture was sealed in a stainless steel pressure vessel lined with polytetrafluoroethylene and heated in an oven at 150° C. at the autogenous pressure for 168 hours. The solid reaction produce was recovered by centrifuging, washed with water and dried in air at ambient temperature.

A portion of the solid reaction product was analyzed and the following chemical analysis obtained:

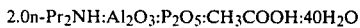

|  | Weight Percent |
|---|---|
| Carbon | 8.0 |
| Nitrogen | 1.5 |
| Al$_2$O$_3$ | 33.2 |
| P$_2$O$_5$ | 45.9 |
| Loss on Ignition | 21.6 |

The above chemical analysis corresponds to a product composition in molar oxide ratios of:

0.16n-Pr$_2$NH:Al$_2$O$_3$:P$_2$O$_5$:0.9H$_2$O

The solid reaction product contained a small amount of impurity but the major phase had an X-ray powder diffraction pattern characterized by the following data:

TABLE III

| 2θ | d, (A) | Intensity, 100× (I/Io) |
|---|---|---|
| 9.49 | 9.32 | 90 |
| 13.45 | 6.59 | 47 |
| 18.46 | 4.81 | 43 |
| 21.30 | 4.17 | 98 |
| 22.88 | 3.89 | 100 |
| 26.98 (br) | 3.31 | 8 |
| 27.90 (br) | 3.20 | 5 |
| 28.16 | 3.17 | 6 |
| 28.65 (sh) | 3.12 | 11 |
| 30.29 | 2.95 | 33 |
| 34.59 | 2.59 | 7 |
| 34.88 | 2.57 | 9 |
| 38.27 | 2.35 | 8 | br = broad
sh = shoulder

EXAMPLE 2

(a) AlPO$_4$-39 was prepared as in Example 1 except that the crystallization time was 48 hours.

The solid reaction product was recovered by centrifuging, washed with water and dried in air at ambient temperature. The solid reaction product has an X-ray powder diffraction pattern characterized by the following data.

TABLE IV

| 2θ | d, (A) | Intensity 100× (I/Io) |
|---|---|---|
| 9.52 | 9.29 | 81 |
| 13.46 | 6.58 | 49 |
| 18.52 | 4.79 | 42 |
| 21.34 | 4.17 | 100 |
| 22.92 | 3.89 | 94 |
| 27.37 | 3.26 | 5 |
| 28.05 (br) | 3.18 | 5 |
| 28.22 | 3.16 | 7 |
| 28.74 | 3.11 | 13 |
| 30.32 | 2.95 | 34 |
| 34.53 | 2.60 | 6 |
| 34.86 | 2.57 | 11 |
| 38.36 | 2.35 | 10 |
| 38.53 | 2.33 | 7 | br = broad (b) A portion of the reaction product was calcined in air at about 600° C. for 4.75 hours. The calcined product was an X-ray powder diffraction pattern as set forth in Table C below:

TABLE C

| 2θ | d, (A) | Intensity 100× (I/Io) |
|---|---|---|
| 9.53 | 9.28 | 30 |
| 13.56 | 6.53 | 100 |
| 18.64 (br) | 4.76 | 33 |
| 19.12 (br) | 4.64 | 25 |
| 21.53 | 4.13 | 41 |
| 22.68 (br) | 3.93 | 22 |
| 23.09 (br) | 3.86 | 21 |
| 23.23 (br) | 3.82 | 22 |
| 29.23 | 3.05 | 14 |
| 29.54 | 3.02 | 10 | br = broad (c) Adsorption capacities for AlPO$_4$-39 [prepared in part (b), supra] were measured using a standard McBain-Bakr gravimetric adsorption apparatus. The following data were obtained on te calcined sample of part (b) activated at 350° C.:

| | Diameter (A) | Pressure (Torr) | Temp (°C.) | Wt. % Adsorbed |
|---|---|---|---|---|
| Oxygen | 3.46 | 100 | −183 | 10.2 |
| n-Butane | 4.3 | 100 | 25 | 1.7 |
| i-Butane | 5.0 | 100 | 25 | 0.8 |
| H$_2$O | 2.65 | 4.6 | 25 | 18.1 |

From the above data, the pore size of the calcined product was determined to be greater than about 3.46 Angstroms (A) as shown by the adsorption of oxygen (kinetic diameter of 3.46 A) and less than about 4.3 A as shown by nil adsorption of n-butane (kinetic diameter 4.3 A).

(d) The sample used for the McBain-Bakr gravimetric adsorption measurements in part (c) was again analyzed to determine the X-ray powder diffraction pattern and was found to be characterized by the X-ray pattern set forth in Table C, supra.

What is claimed is:

1. Microporous crystalline aluminophosphate having an essential framework structure whose chemical composition expressed in terms of mole ratios of oxides is Al$_2$O$_3$:1.0±0.2P$_2$O$_5$ and having a characteristic X-ray powder diffraction pattern containing at least the following d-spacings

| d, (A) | Relative Intensity |
|---|---|
| 9.32–9.29 | S |
| 6.58 | M |
| 4.81–4.79 | M |
| 4.17–4.16 | VS |
| 3.88–3.89 | VS |
| 2.95–2.96 | M. |

2. Microporous crystalline aluminophosphate which results from the calcination of the composition of claim 1 at a temperature of at least 300° C.

3. Microporous crystalline aluminophosphate having an essential framework structure whose chemical composition expressed in terms of mole ratios of oxides is Al$_2$O$_3$:1.0±0.2P$_2$O$_5$ and having a characteristic X-ray powder diffraction pattern containing at least the following d-spacings

| d, (A) | Relative Intensity |
|---|---|
| 9.28 | W-M |
| 6.53 | VS |
| 4.65–4.76 | W |
| 4.14 | W-M |
| 3.82–3.93 | W |
| 3.06 | W |
| 3.02 | W. |

4. Process for preparing a microporous crystalline aluminophosphate of claim 1 which comprises forming a reaction mixture having a compensation expressed in terms of mole ratios of oxides of $Al_2O_3:1.0\pm0.5P_2O_5:7-100H_2O$ and containing from about 1.5 to about 2 moles of di-n-propylamine per mole of $Al_2O_3$ and from about 0.25 to 1.5 moles of an organic or mineral acid per mole of $Al_2O_3$, and heating the reaction mixture thus formed at a temperature of at least 100° C. under autogenous pressure until crystals of said aluminophosphate are formed.

5. Process according to claim 4 wherein the acid present in the reaction mixture is acetic acid and the di-n-propylamine is present in an amount of about 2 moles per mole of $Al_2O_3$.

* * * * *